Figure 1:
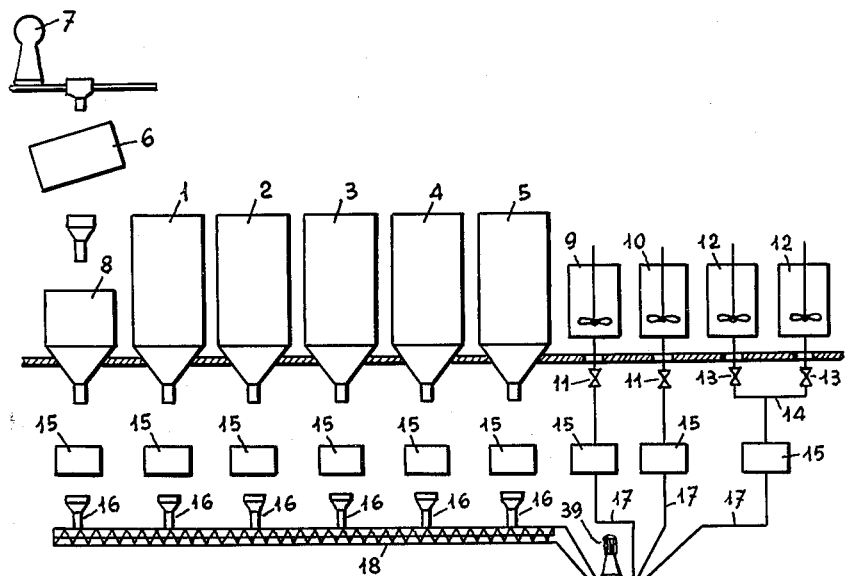

Oct. 16, 1962    M. BALLESTRA    3,058,622
DEVICE FOR CONTINUOUSLY MEASURING, MIXING AND DE-AERATING
MATERIALS FED TO PROCESS PLANT
Filed Nov. 24, 1958

United States Patent Office 3,058,622
Patented Oct. 16, 1962

3,058,622
DEVICE FOR CONTINUOUSLY MEASURING, MIXING AND DE-AERATING MATERIALS FED TO PROCESS PLANT
Mario Ballestra, Via XX Settembre 40/8, Genoa, Italy
Filed Nov. 24, 1958, Ser. No. 775,929
Claims priority, application Italy Jan. 14, 1958
2 Claims. (Cl. 222—77)

The invention relates to devices for continuously feeding measured quantities of mixtures of several components in predetermined proportions to industrial process plants; the components being either all solids or partly solids and partly liquids; and it often being necessary that the mixture be de-aerated before being passed on to further processing units.

The whole feeding flow must be continuously checked and controlled and, furthermore provision must be made for altering the fraction of each component of the mixture without interruption of the feed.

The object of the present invention is to provide an apparatus that will properly fulfil the above requirements.

According to the invention the apparatus consists in the first place of a combination of as many measuring units as there are solid or liquid components to be mixed, together with a conveying-mixing device; each measuring unit being equipped with an appropriate measurement recorder.

And further, according to the invention, there may be provided, when necessary, a pre-mixer to make a preliminary mixture of substances that are used in lesser amounts, this preliminary mixture then being regarded as merely a further main component to be measured out for the main mixture.

According to the invention each main component, and each substance required in lesser amount, is measured out by means of an automatic dosing device or doser, which is itself fed by a vibrating feeder, which is fed from a hopper. The automatic doser is connected to a balance in such a way that the action of the doser is governed both by its own weight and by the weight of the charge it contains. When the weight of the charge reaches the value desired for the component being measured, the balance actuates an electric or mechanical device, which acts on the vibratory feeder, with the result that the doser discharges the desired quantity into the conveyor-mixer.

Furthermore, according to the invention, the conveyor-mixer is followed by a main mixing unit which receives the several components, liquid as well as solid, required for the preparation of the final mixture.

A still further provision, according to the invention, is a device down stream of the main mixing unit, to govern the digestion time for the mixture, before it is dispatched to the subsequent units of the industrial plant.

And finally, according to the invention, there may if necessary be provided after the digestion regulator, a de-aerator with a mechanical action or working by the effect of vacuum.

The attached drawings show, in diagrammatic form, and merely to provide an illustrative example, the general lay-out of an apparatus according to the present invention, together with the dosing device, or doser, one of which is used for each of the main components and for each mixture of those components that is added in lesser amounts.

Figure 2:
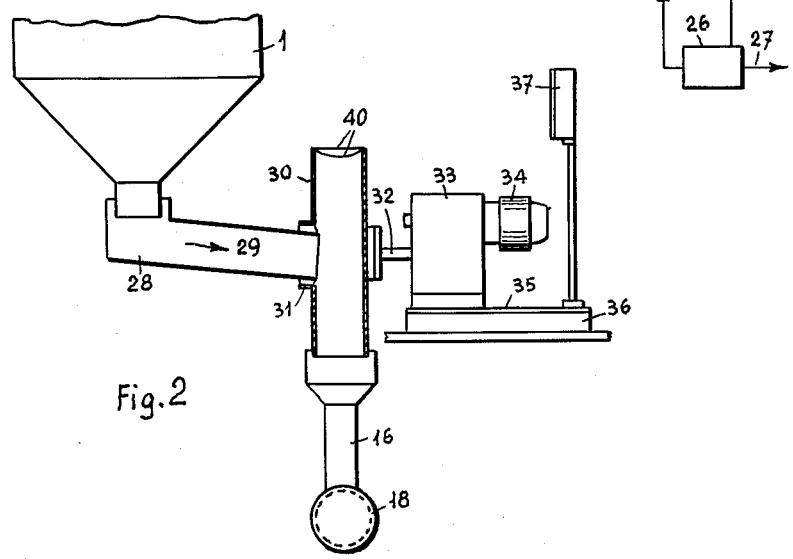

FIGURE 1 shows the general lay-out of the installation, and FIGURE 2 gives a view from the side of one of the automatic dosing devices.

In FIGURE 1, the hoppers 1 to 5 hold as many of the main components as are needed for the mixture. The container 6 (optional) is a pre-mixer for those components used only in lesser amounts and which are fed from the ordinary balance 7 and then, after mixing, pass to the small hopper 8. The containers 9 and 10 hold liquids and are furnished at their outlets with valves or cocks 11. In some cases it may be an advantage to use additional containers 12, to hold liquid components used only in lesser amounts in the mixture. The valves or cocks 13 lead to the common pipe 14 which acts as a pre-mixer for these lesser liquid components. In FIGURE 1 the number 15 indicates the device shown in greater detail in FIGURE 2, this being a device for weighing out and then dispatching onward pre-determined weights of a particular solid or liquid component, or of a mixture of solid or liquid components. This device will be described later. The effect of its action is that weighed out quantities of solids are passed through the duct 16 into the conveyor-mixer 18 and so to the main mixer 19, and that weighed quantities of liquids are passed through the pipes 17 and so also into the main mixer 19. From here the mixture is taken through the larger diameter pipe 20, which is sloped to prevent aeration, into the lower part of the device 21 where the digestion time is regulated by means of the appropriate devices 22 and 23. The discharge pipe 24 of the main mixer 19 is governed by the valve or cock 25 and this line is used when it is desired to drain mixer 19.

For those plants that require it, there is provided the deaerator 26, either mechanical or vacuum, and thus the properly measured and proportioned, homogeneous and de-aerated mixture is sent forward in the direction of the arrow 27, for subsequent processing or use.

Referring now to FIGURE 2, the hopper, which may for example be the hopper 1, containing a solid main component or a prepared mixture of the solid components used only in lesser amounts, discharges this material into the end of a feeder such as the inclined vibratory feeder 28, which moves the material in the direction of the arrow 29 and so discharges it into the interior or the drum 30 through the axial opening 31, provided in the drum; the end of the feeder projecting into the drum through this opening. This drum 30 is furnished with an opening 40 on its peripheral surface, and is mounted on the slower axle of the reducing gear 33, which is driven by the small, continuously turning electric motor 34. A continuously turning motor of this kind does not become worn by repeated starts and stops and, in general, the objectionable changes of inertia from repeated accelerations are avoided. The drum 30, the motor 34 and the reducing gear 33 are all mounted on the platform of a balance 36, or other suitable device, whose indicating dial 37 is equipped, in a well known manner, with electric contacts to activate the vibrating feeder 28 and make it run until the instant when the weight of the material in the drum has reached a predetermined value. The electric contacts are adjustable to the desired setting. At the proper moment the vibratory feeder 28 stops and thus the feed to the drum, in the direction of the arrow 29, is interrupted. When the rotation of the drum 30 brings the opening 40 to the bottom of its path the weighed amount of material is discharged into the duct 16 and thus passes to the conveyor-mixer 18.

The action of the drum 30 is regulated at will by changing its rotational velocity and by adjusting the positions of the electric contacts that start and stop the vibratory feeder 28.

Drum 30 rotates continuously in view of the fact that it is connected to the shaft 32 of the reducing gear 33 activated by the electric motor 34. Drum 30 is fed intermittently by feeder 28 and has an opening 40 which, when at the bottom, discharges the material.

The feeder 28 feeds the drum 30 continuously until the scale indicates that the desired quantity of the material has been fed to the drum. At this point, the scale contacts stop the operation of the feeder. The drum 30, rotating continuously at a uniform speed, brings the opening 40 towards the bottom at regular intervals. Thus, there are discharged equal quantities of material at equal periods of time.

The feeder 28 can suitably be controlled by a vibrator or other means, all of which are activated by the balance when it registers a predetermined weight.

In the case of liquid components or prepared mixtures of liquid components the electric contacts govern circuits that open and close the valves or cocks 11 and 13.

The liquid components from the containers 9, 10 and 12 are preferably added to the solid mixture arriving along the conveyor-mixer 18 in the interior of the main mixer 19. The device 38 is a means of mixing substances in the main mixer 19, and is driven by the motor 39.

The operation of the apparatus follows directly from the description given above.

Although to provide clarity in explanation the invention has been illustrated according to the above description there may nevertheless be many modifications and variations in its practical realization. For example the weighing device for each hopper may be replaced by a timing device to discharge the material when the quantity is right. This and other variations must nevertheless still be considered to fall within the scope of the present invention.

What I claim is:

1. A measuring device for use in combination with a supply container for continuously measuring components to be mixed to form a homogeneous mixture, which comprises a rotatable drum having an opening on its peripheral surface and an axial inlet for receiving the material to be mixed from a supply container, means for continuously rotating said drum, and weighing means for continuously indicating the amount of material charged to said drum through said axial inlet, said drum being effective to contain said material during a portion of a complete rotation thereof while said material is being weighed by said weighing means and being effective to discharge said material when said opening reaches a predetermined position.

2. A measuring device for use in combination with a supply container for continuously measuring components to to be mixed to form a homogeneous mixture, which comprises a drum rotatable about a substantially horizontal axis and having an opening on its peripheral surface and an axial inlet for receiving the material to be mixed from a supply container, means for continuously rotating said drum, and weighing means supporting said drum for continuously indicating the amount of material charged to said drum through said axial inlet, said drum being effective to contain said material during a portion of a complete rotation thereof while said material is being weighed by said weighing means and being effective to discharge said material when said opening reaches a lowermost position.

References Cited in the file of this patent

UNITED STATES PATENTS

| | | |
|---|---|---|
| 2,105,266 | Rendall | Jan. 11, 1938 |
| 2,568,821 | Perrot | Sept. 25, 1951 |
| 2,727,733 | Carswell | Dec. 20, 1955 |
| 2,786,820 | Uschmann | Mar. 26, 1957 |
| 2,823,005 | Lindars | Feb. 11, 1958 |
| 2,863,651 | McBride | Dec. 9, 1958 |
| 2,873,955 | Sauer | Feb. 17, 1959 |